(12) United States Patent  (10) Patent No.: US 10,478,017 B1
Kam  (45) Date of Patent: Nov. 19, 2019

(54) COOKING APPARATUS UTILIZING GASEOUS FUEL

(71) Applicant: Rankam (China) Manufacturing Co. Ltd., Hong Kong (CN)

(72) Inventor: Andy Ning Fan Kam, Hong Kong (CN)

(73) Assignee: Rankam (China) Manufacturing Co. Ltd., Hong Kong (HK)

( * ) Notice: Subject to any disclaimer, the term of this patent is extended or adjusted under 35 U.S.C. 154(b) by 225 days.

(21) Appl. No.: 15/350,245

(22) Filed: Nov. 14, 2016

(51) Int. Cl.
*A47J 37/00* (2006.01)
*A47J 37/07* (2006.01)
*A23L 5/10* (2016.01)

(52) U.S. Cl.
CPC .............. *A47J 37/0727* (2013.01); *A23L 5/10* (2016.08); *A47J 37/0786* (2013.01); *A23V 2002/00* (2013.01)

(58) Field of Classification Search
CPC ..... A23B 4/0523; A23B 4/0526; F23D 14/10; A23L 5/10; A47J 37/074
See application file for complete search history.

(56) References Cited

U.S. PATENT DOCUMENTS

| | | | |
|---|---|---|---|
| 1,187,260 A | 6/1916 | Child | |
| 1,791,565 A * | 2/1931 | Brown | F23D 91/02 |
| | | | 431/159 |
| 1,933,790 A * | 11/1933 | Crone | F23D 14/10 |
| | | | 431/172 |
| 4,787,364 A | 11/1988 | Zepeda | |
| 5,127,824 A * | 7/1992 | Barker | A47J 37/0713 |
| | | | 126/41 R |
| 5,711,663 A | 1/1998 | Giebel et al. | |
| 6,114,666 A | 9/2000 | Best | |
| D443,354 S | 6/2001 | Johnston | |
| D443,795 S | 6/2001 | Rimback | |
| 6,699,036 B2 | 3/2004 | Schlosser et al. | |
| 8,113,191 B2 | 2/2012 | Hong | |
| 8,227,728 B2 | 7/2012 | Best | |
| 8,776,775 B2 | 7/2014 | Ahmed et al. | |
| 9,134,033 B2 | 9/2015 | Nevarez et al. | |
| 2004/0025862 A1 | 2/2004 | Lor et al. | |
| 2009/0095169 A1 * | 4/2009 | York | A47J 27/004 |
| | | | 99/448 |
| 2012/0266856 A1 * | 10/2012 | Zelek | A47J 37/067 |
| | | | 126/25 R |

* cited by examiner

*Primary Examiner* — Jason Lau
(74) *Attorney, Agent, or Firm* — Lucian Wayne Beavers; Patterson Intellectual Property Law, PC

(57) ABSTRACT

Briefly, the present disclosure relates, in one embodiment, to a cooking apparatus. The cooking apparatus may include a plurality of chamber walls defining a chamber. The chamber includes a plurality of chamber corners, a chamber bottom end, and a chamber top end. A gas burner including a burner tube is located nearer the chamber bottom end than the chamber top end. The burner tube may include a plurality of tube runs. Each tube run includes a run length extending substantially parallel with a respective chamber wall. A majority of the run length may include a closed wall section of the burner tube. The burner tube may also include a plurality of tube bends. Each tube bend is disposed between two respective tube runs and may include a porous wall section of the burner tube.

20 Claims, 14 Drawing Sheets

COOKING APPARATUS UTILIZING GASEOUS FUEL

BACKGROUND

The present disclosure relates generally to a cooking apparatus that utilizes gaseous fuel. More particularly, the present disclosure pertains to an oil-less roaster.

Cooking with gaseous fuel is known in the art. Many prior art gaseous fuel burners, however, simply produce heat evenly throughout the bottom of the cooking chamber and do not control the path of the heat produced.

What is needed, therefore, is a more controlled heat production and transfer in the cooking chamber.

BRIEF SUMMARY

Briefly, the present disclosure relates, in one embodiment, to a cooking apparatus. The cooking apparatus may include a plurality of chamber walls defining a chamber. The chamber includes a plurality of chamber corners, a chamber bottom end, and a chamber top end. A gas burner including a burner tube is located nearer the chamber bottom end than the chamber top end. The burner tube may include a plurality of tube runs. Each tube run includes a run length extending substantially parallel with a respective chamber wall. A majority of the run length may include a closed wall section of the burner tube. The burner tube may also include a plurality of tube bends. Each tube bend is disposed between two respective tube runs and may include a porous wall section of the burner tube.

Some embodiments include the chamber forming a rectangular enclosure including four chamber corners formed by four chamber walls. The burner tube forms a generally rectangular gas burner with four tube bends.

Another embodiment includes the burner tube having a burner tube intake end and a burner tube termination end. The intake end and the termination end define a space therebetween. A partial tube run is connected to the burner tube intake end and a respective tube bend. A floating tube bend is connected to the burner tube termination end and a respective tube run.

Still another embodiment includes a plurality of flame director plates. Each flame director plate may be disposed over a respective tube bend.

Yet another embodiment includes each flame director plate defining at least one flame director hole therein.

Another embodiment includes the gas burner tube defining a burner plane. Each flame director plate forms an acute angle with the burner plane.

A further embodiment includes a grease collector disposed in the chamber nearer the chamber bottom end than the chamber top end. The grease collector may block at least one closed wall section of the burner tube.

A further still embodiment includes a plurality of inner heat shields. Each inner heat shield may be connected to the grease collector adjacent a respective flame director plate.

Yet another embodiment includes each inner heat shield integrally formed with a respective flame director plate.

Still another embodiment includes the grease collector having a plurality of chamfered corners. Each chamfered corner may be positioned over a respective tube bend and configured to define a corner flow passage for the heat emitted from the tube bend.

An even further embodiment includes a plurality of outer heat shields. Each outer heat shield may be disposed between a tube bend and a respective chamber corner.

Another embodiment includes a chamber lid removably disposed on the chamber walls at the chamber top end. The chamber lid and the chamber walls may define a ventilation gap between each chamber wall and the chamber lid.

One embodiment includes the chamber lid having a plurality of spacers. Each spacer may be configured to receive a respective chamber wall and to maintain a respective ventilation gap.

The present disclosure also relates, in one embodiment, to a cooking apparatus. The cooking apparatus may include a plurality of chamber walls defining a chamber. The chamber may include a plurality of chamber corners, a chamber bottom end, and a chamber top end. A gas burner including a burner tube is located nearer the chamber bottom end than the chamber top end. The burner tube may include a plurality of tube runs. Each tube run may include a run length extending substantially parallel with a respective chamber wall. The burner tube may also include a plurality of tube bends. Each tube bend may be disposed between two respective tube runs. A blocking plate may be disposed in the chamber nearer the chamber bottom end than the chamber top end. The blocking plate may cover a majority of the run length of each tube run.

A further embodiment includes a grease collector disposed in the chamber nearer the chamber bottom end than the chamber top end. The grease collector may define the blocking plate.

A further still embodiment includes the grease collector and the chamber walls defining a plurality of corner openings. Each corner opening may define a corner flow passage for heat emitted from the burner tube.

An even further embodiment includes a plurality of flame director plates. Each flame director plate may be disposed over a respective corner opening.

Another embodiment includes a plurality of inner heat shields. Each inner heat shield may be connected to a respective flame director plate and disposed between the flame director plate and a center of the chamber.

Still another embodiment includes a plurality of outer heat shields. Each outer heat shield may be disposed between a respective tube bend and a respective chamber corner.

The present disclosure also relates, in an embodiment, to a method of operating a cooking apparatus. The method may include steps as follows: supplying a burner tube with a gaseous fuel; emitting the gaseous fuel from ports defined substantially only on bends of the burner tube; and burning the gaseous fuel in a cooking chamber such that heat generated from combustion of the gaseous fuel is convected toward a top end of the cooking chamber mostly along corners of the cooking chamber. Each corner may be defined as the meeting point of two adjacent sidewalls and extending laterally outward along each sidewall for up to a third of each respective sidewall width.

DETAILED DESCRIPTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

Figure 1:
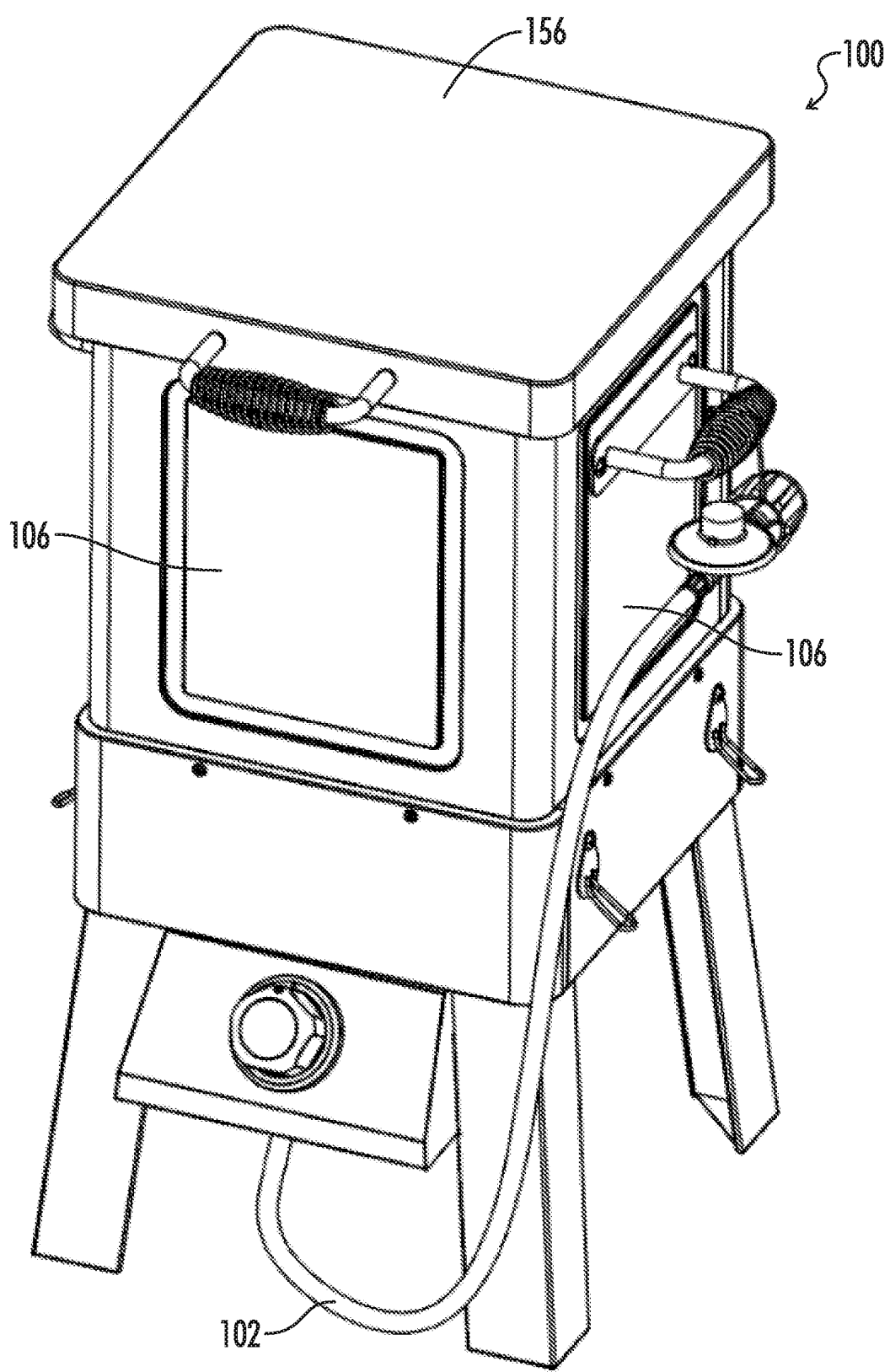
FIG. 1 is a perspective view of one embodiment of a cooking apparatus.
Figure 2:
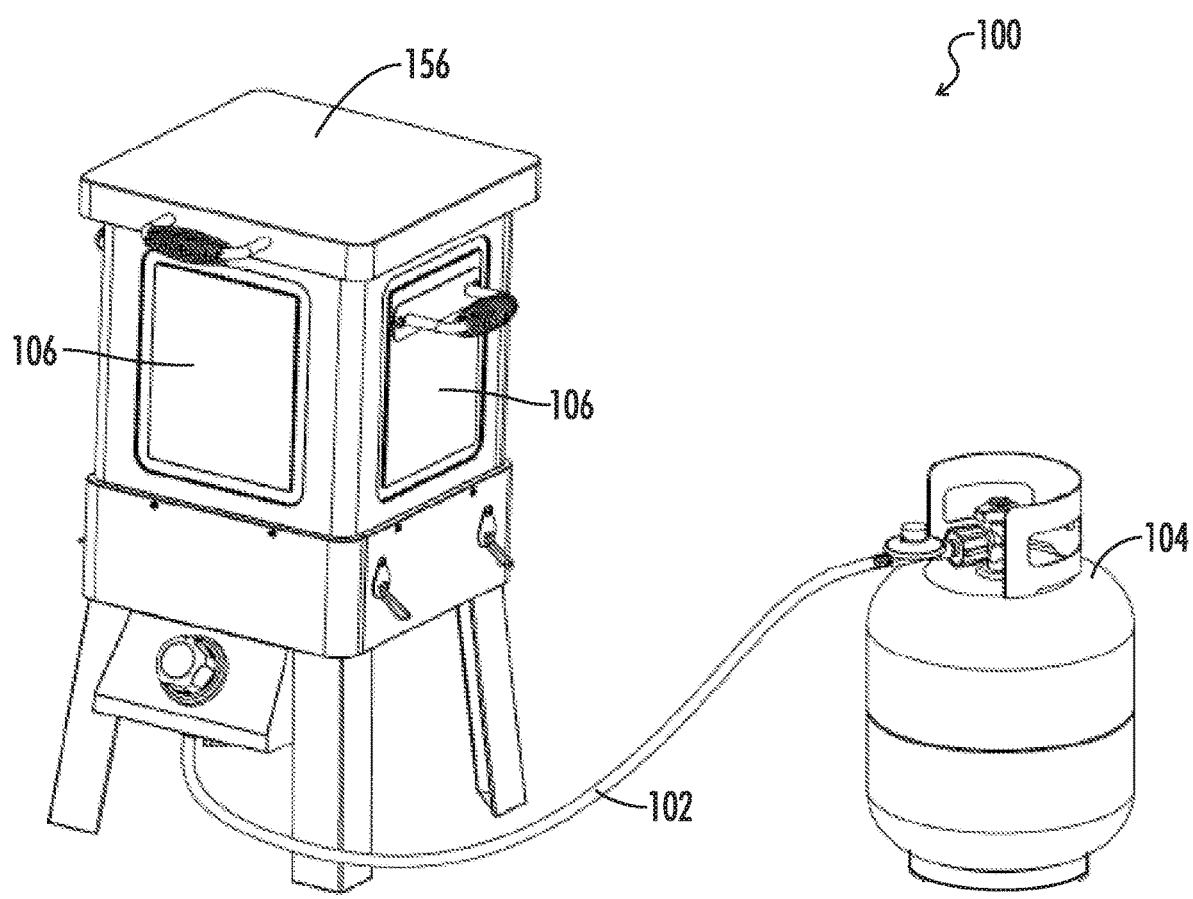
FIG. 2 is a perspective view of the cooking apparatus of FIG. 1 with a fuel tank attached thereto.

Referring to FIG. 1, a cooking apparatus 100 is shown. The cooking apparatus 100 may be of any appropriate shape, but some embodiments include a generally rectangular design. The cooking apparatus 100 may further utilize any appropriate fuel source, but may in some particular embodiments utilize natural gas. As shown in FIGS. 1-4, a gas line 102 may be connected to the cooking apparatus to supply the fuel. In FIG. 2, a natural gas tank 104 is shown connected to the gas line 102.

Figure 3:
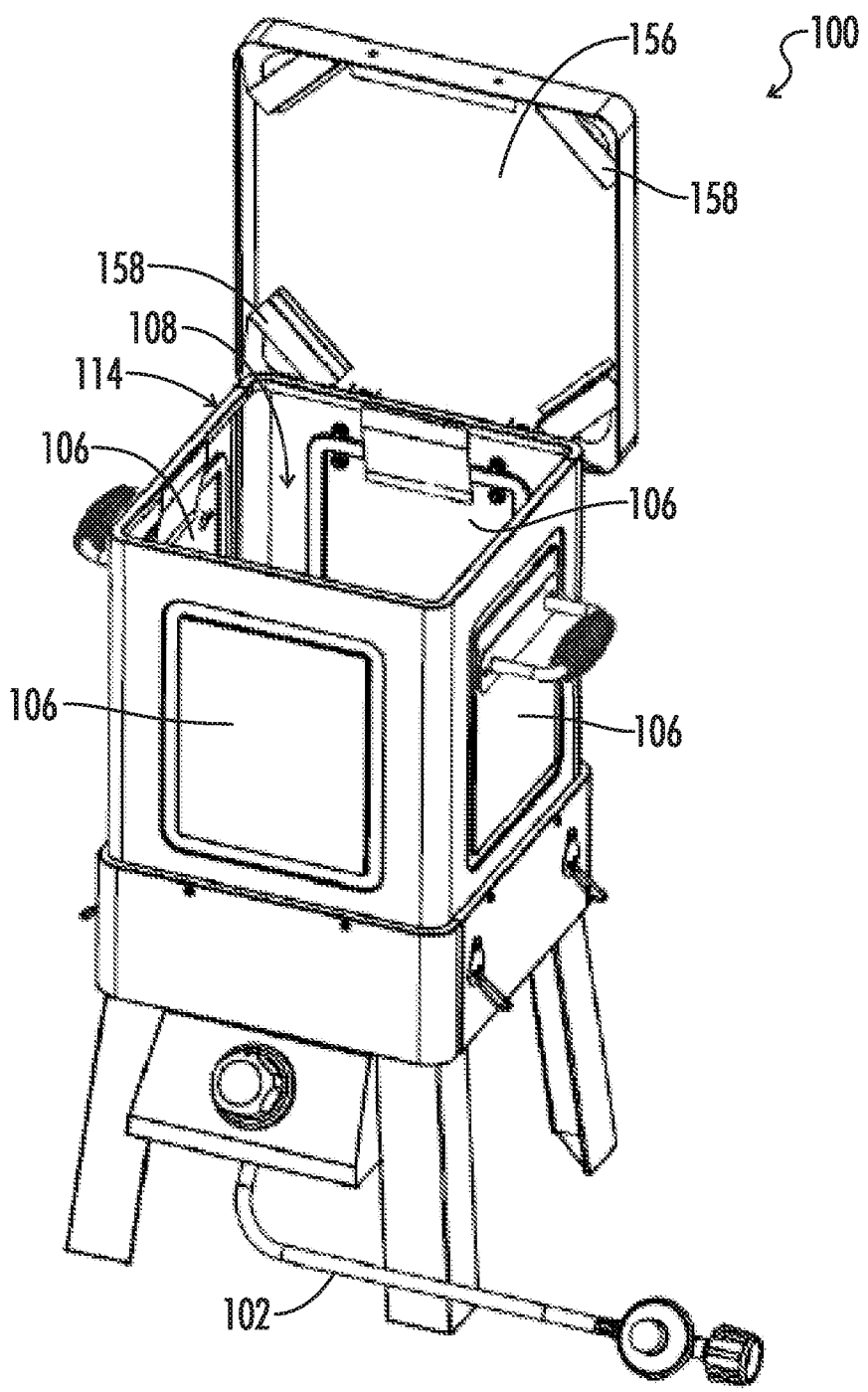
FIG. 3 is a perspective view of the cooking apparatus of FIG. 1 with the lid in an open position.
Figure 4:
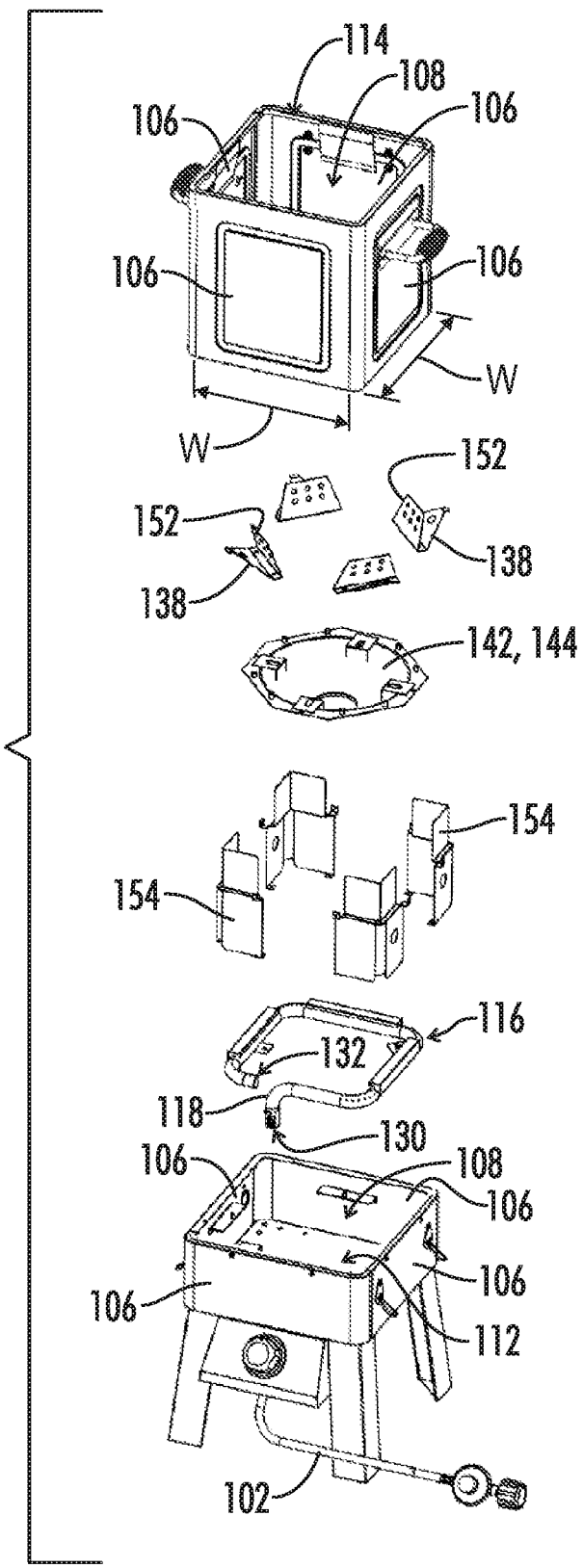
FIG. 4 is an exploded perspective view of the cooking apparatus of FIG. 1.
Figure 5:
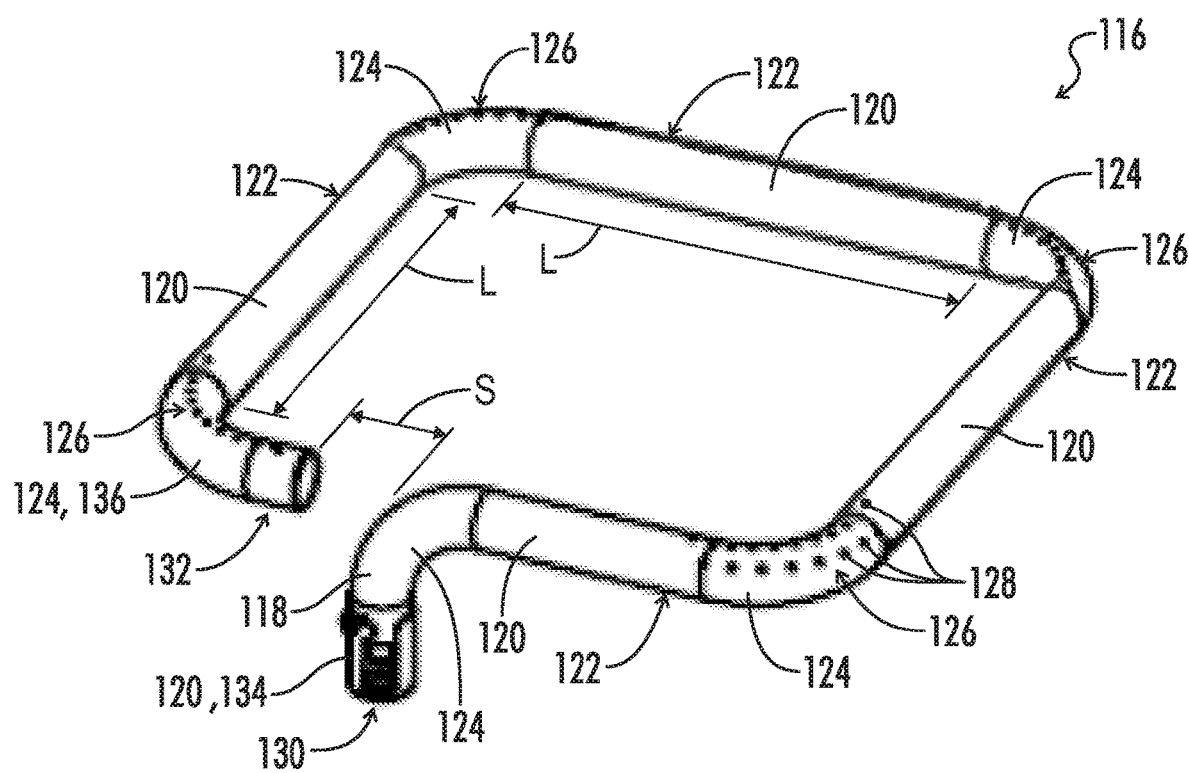
FIG. 5 is a perspective view of the burner shown in FIG. 4.
Figure 6:
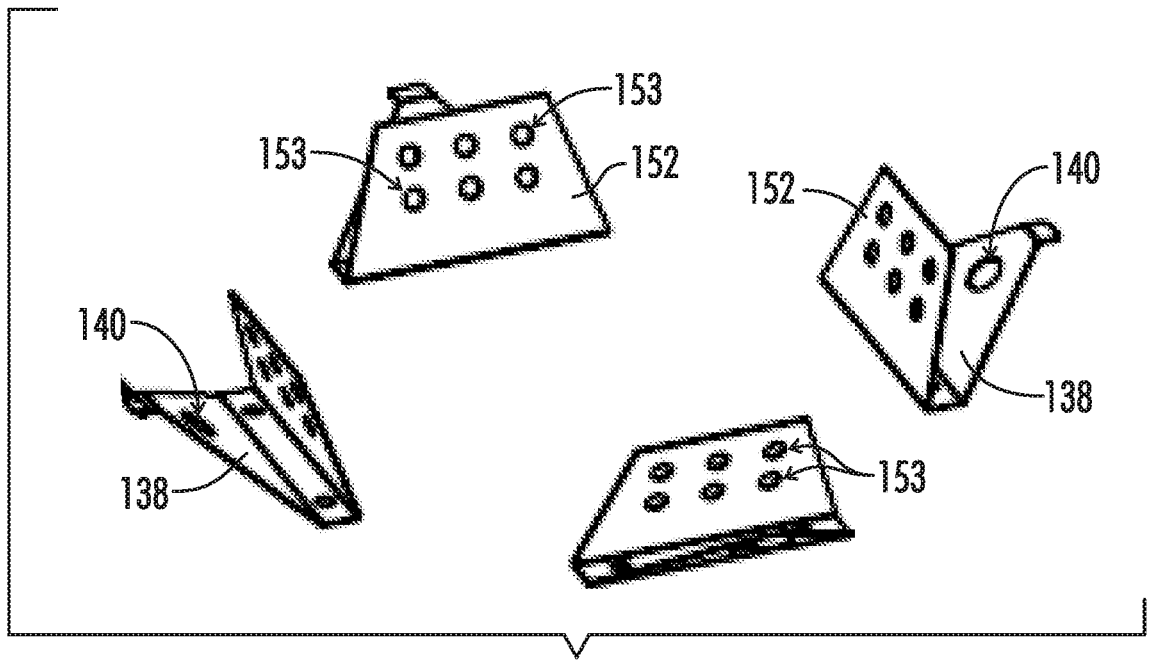
FIG. 6 is a perspective view of the flame director plates and inner heat shields shown in FIG. 4.
Figure 7:
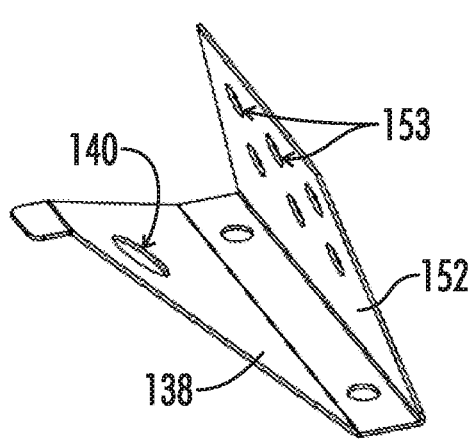
FIG. 7 is a perspective view of one of the flame director plates and a corresponding inner heat shield from FIG. 6.
Figure 8:
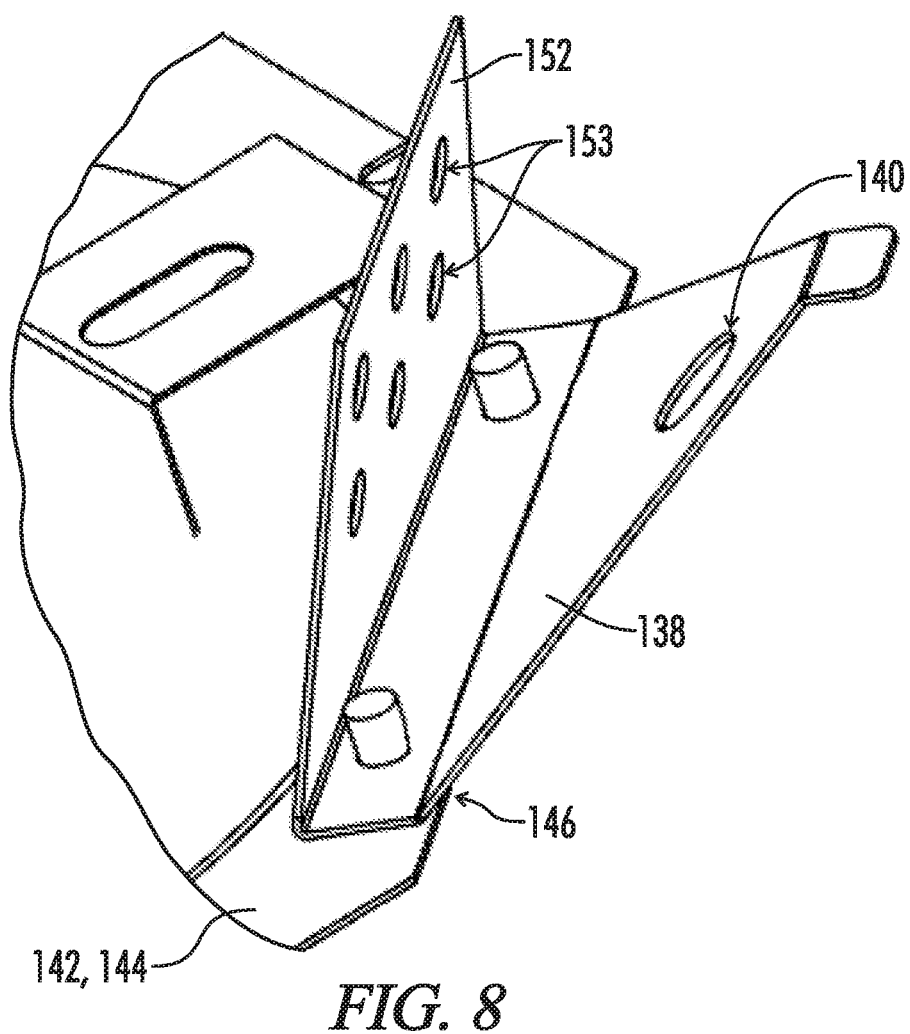
FIG. 8 is a detailed perspective view of one of the flame director plates and a corresponding inner heat shield mounted to the grease collector.
Figure 9:
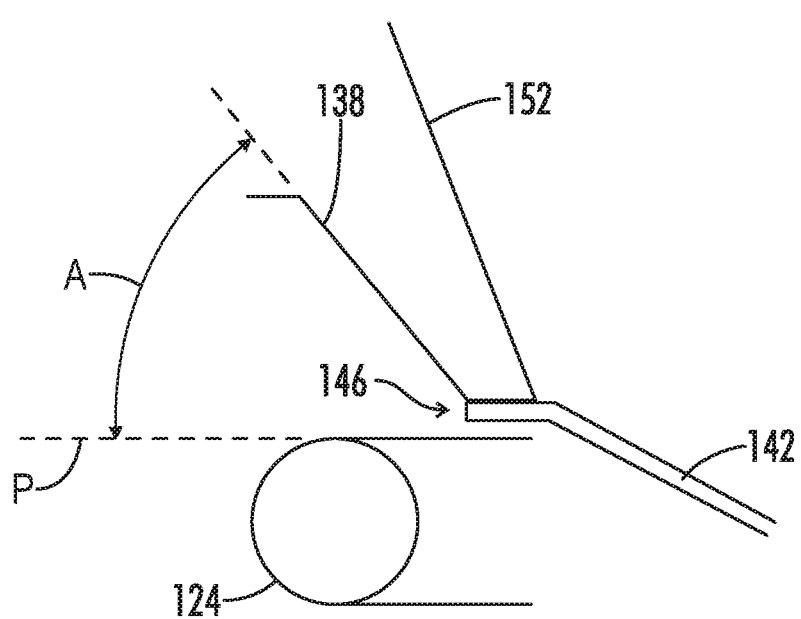
FIG. 9 is a cross-sectional side elevation view of one of the flame director plates and a corresponding inner heat shield mounted to the grease collector over the burner tube.
Figure 10:
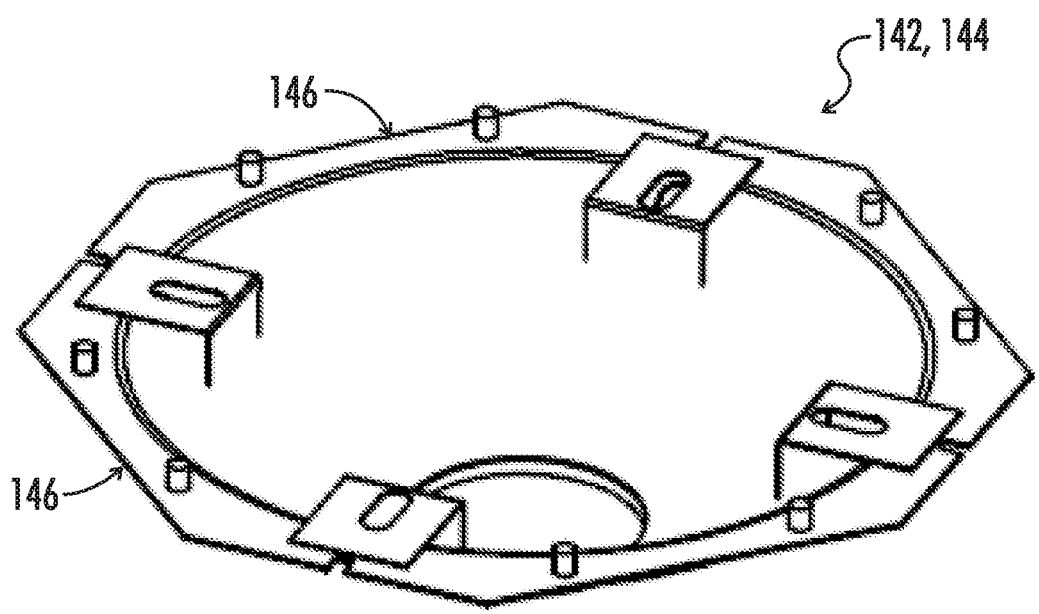
FIG. 10 is a perspective view of the grease collector shown in FIG. 4.
Figure 11:
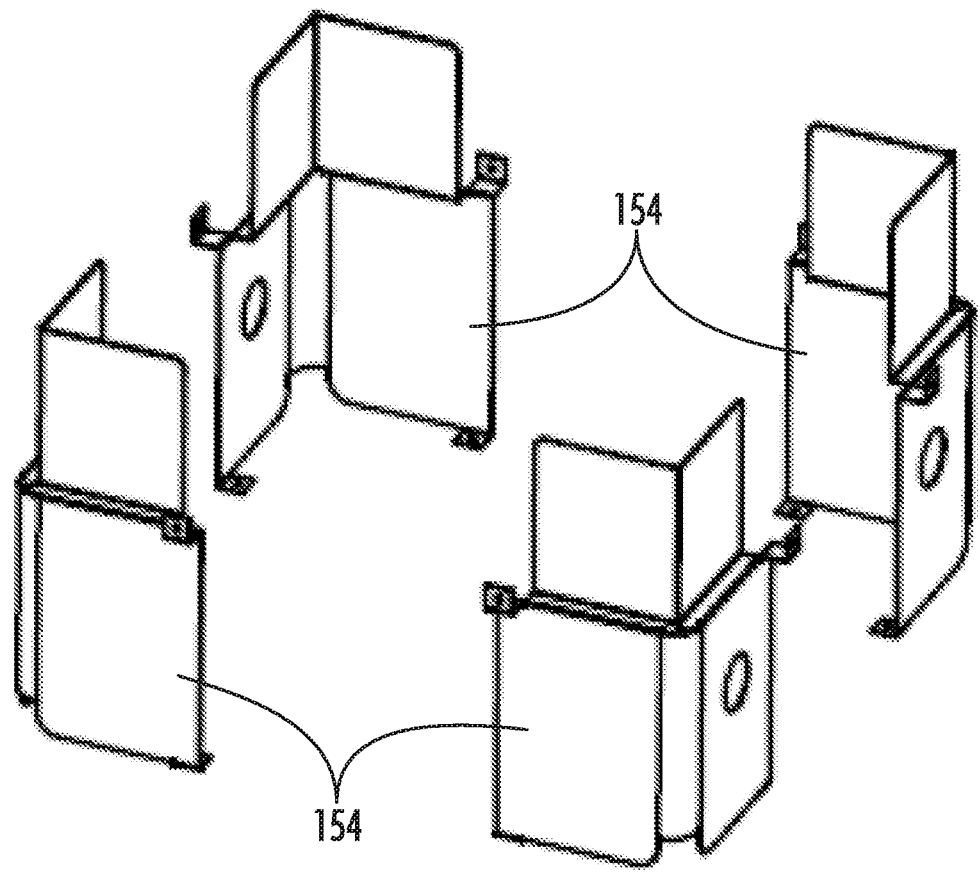
FIG. 11 is a perspective view of the outer heat shields shown in FIG. 4.
Figure 12:
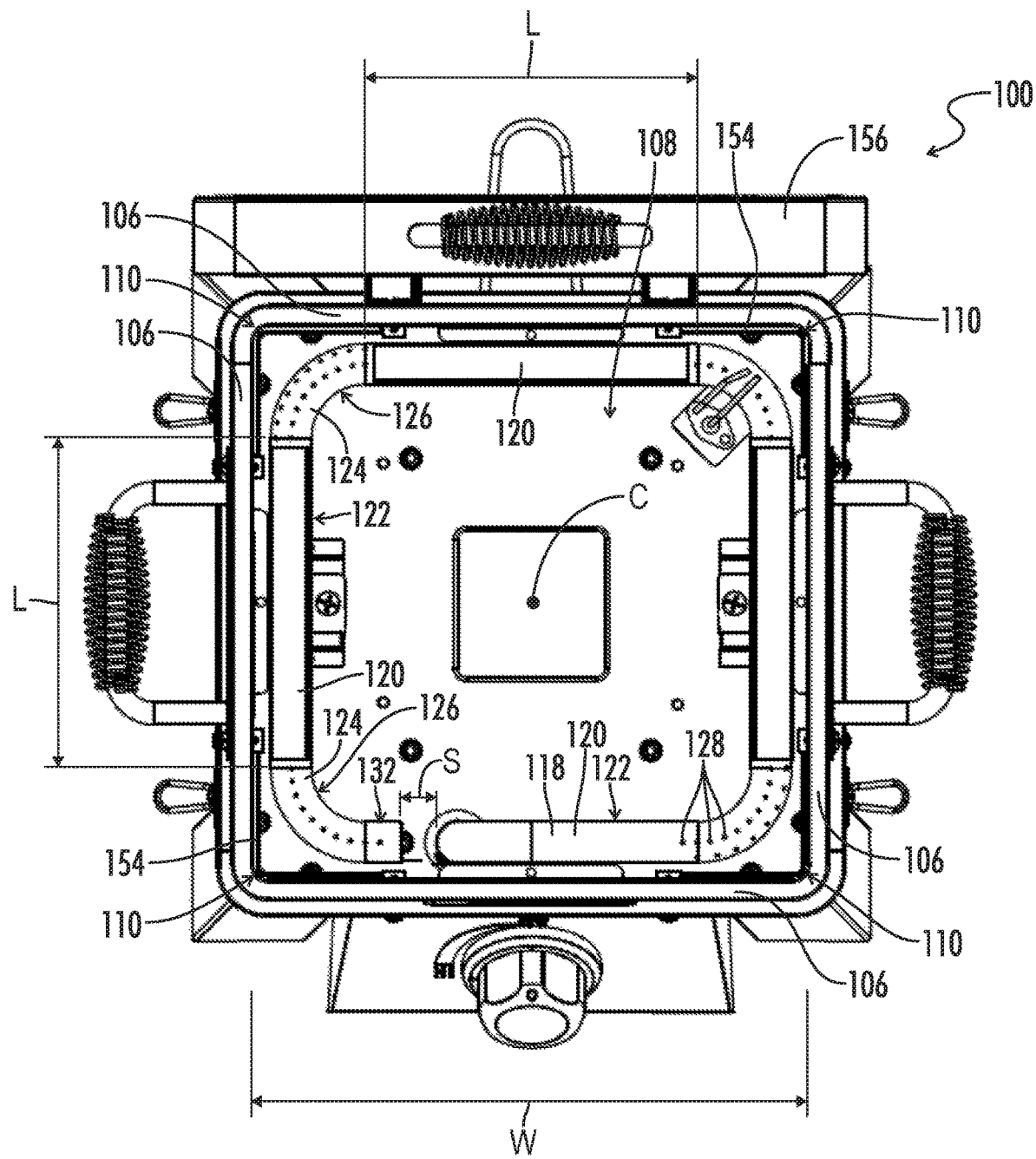
FIG. 12 is a top plan view of the cooking apparatus of FIG. 1 with the lid open and the burner and outer heat shields installed in the chamber.
Figure 13:
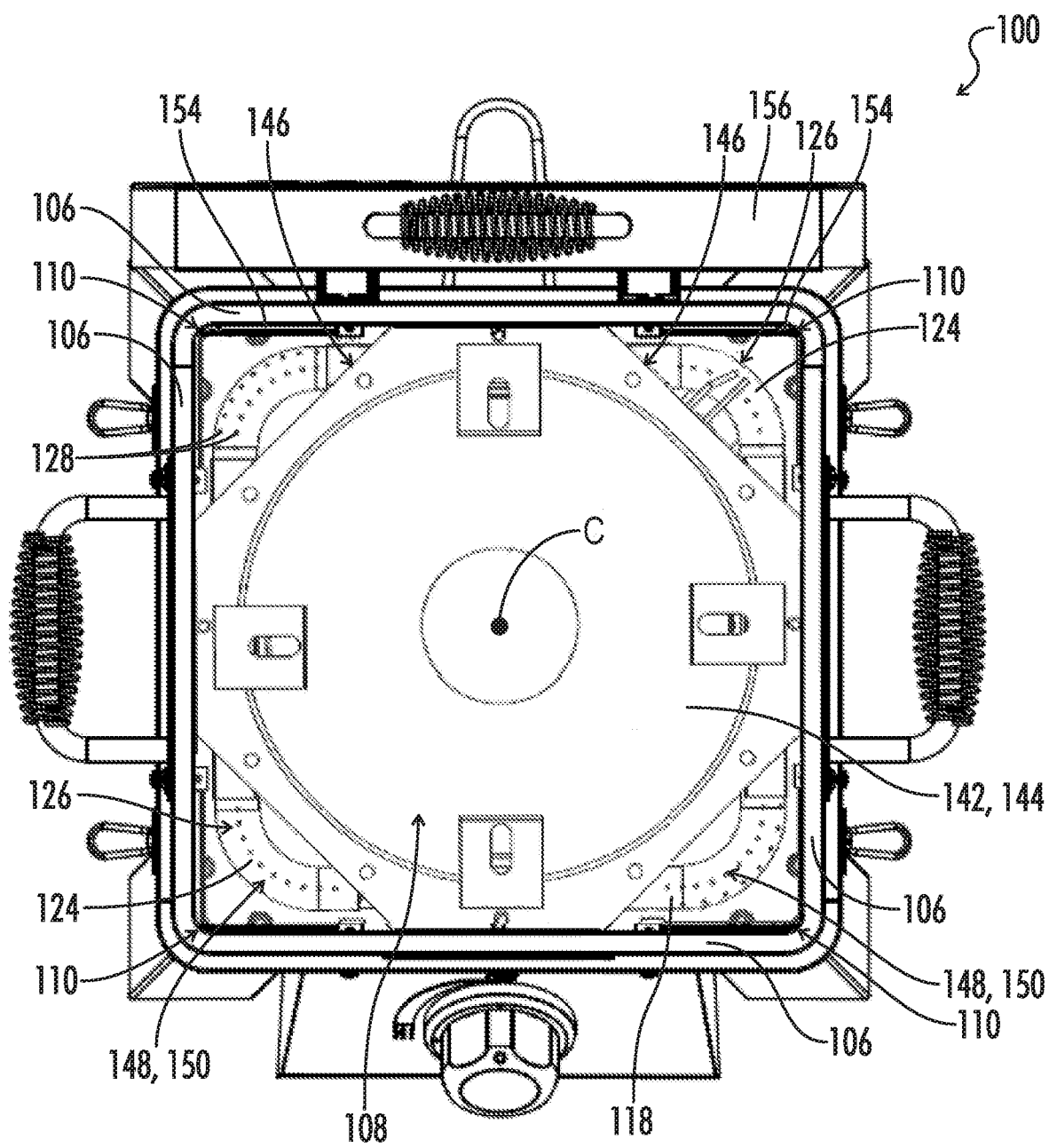
FIG. 13 is a top plan view of the cooking apparatus of FIG. 1 with the lid open and the burner, outer heat shields, and grease collector installed in the chamber.
Figure 14:
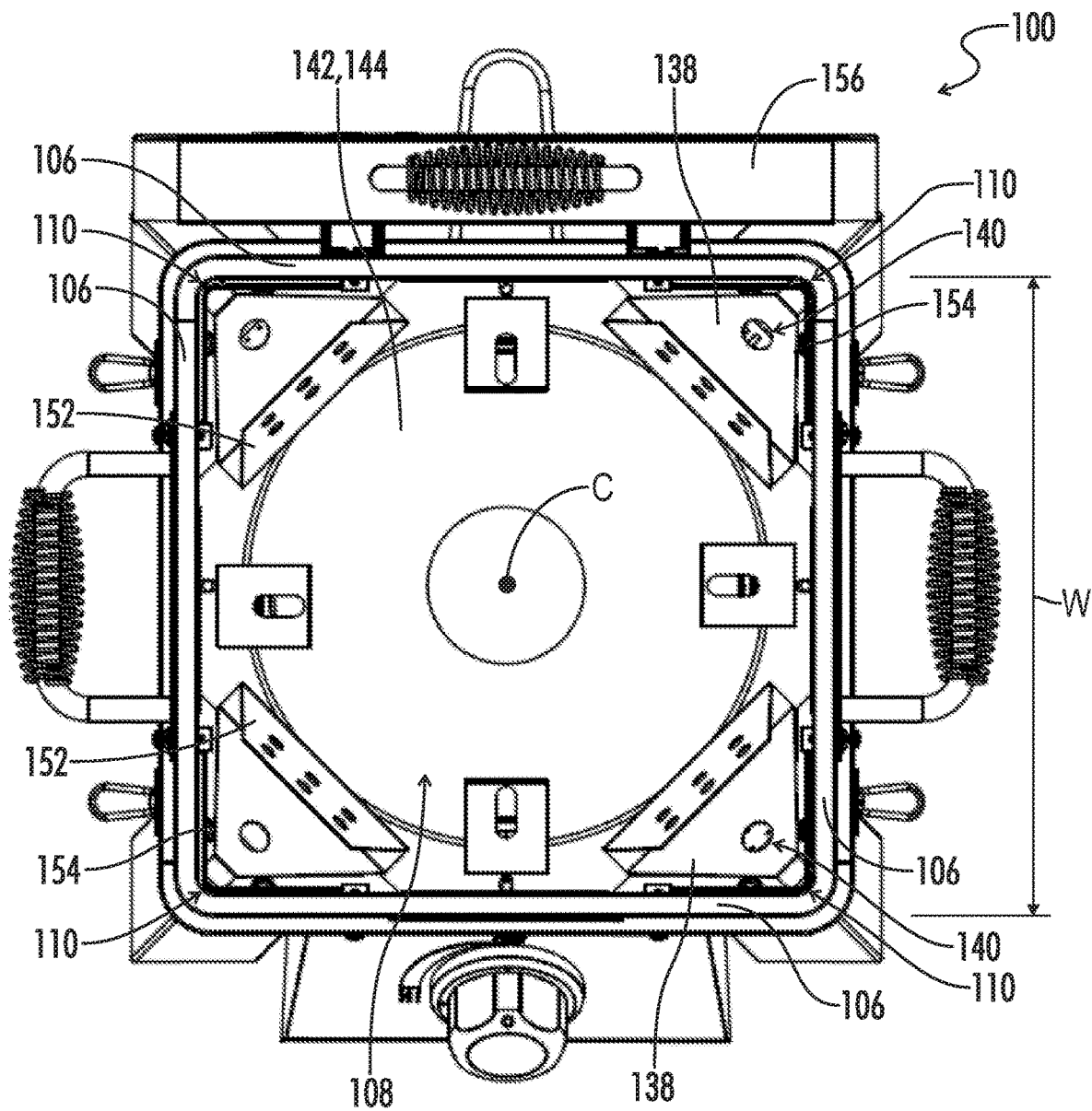
FIG. 14 is a top plan view of the cooking apparatus of FIG. 1 with the lid open and the burner, outer heat shields, grease collector, inner heat shields, and flame director plates installed in the chamber.
Figure 15:
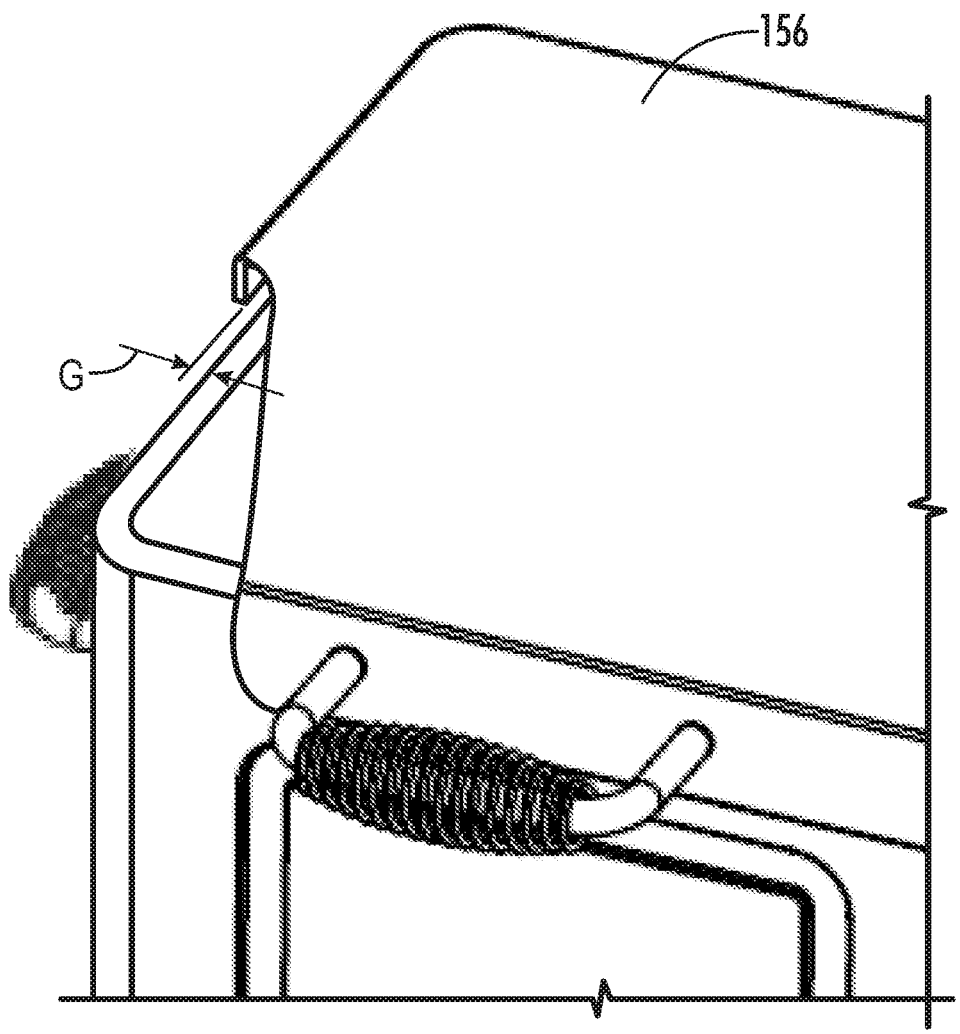
FIG. 15 is a detailed perspective view of the cooking apparatus of FIG. 1 with a portion of the chamber lid cut away.

Turning now to FIGS. 3 and 4, the cooking apparatus 100 may include a plurality of chamber walls 106. The chamber walls 106 may define a chamber 108. As such, there may be as few as three chamber walls 106. Any number of chamber walls 106 above three is contemplated in the current disclosure, however. The chamber 108 may include a plurality of chamber corners 110 (as can best be seen in FIGS. 12-14). The chamber 108 may further include a chamber bottom end 112 and a chamber top end 114.

As shown in FIGS. 4, 5, 12, and 13, a gas burner 116 including a burner tube 118 may be located nearer the chamber bottom end 112 than the chamber top end 114. The burner tube 118 may include a plurality of tube runs 120. Each tube run 120 may include a run length L extending substantially parallel with a respective chamber wall 106. A majority of the run length L may include a closed wall section 122 of the burner tube 118. The burner tube 118 may further include a plurality of tube bends 124. Each tube bend 124 may be disposed between two respective tube runs 120. The tube bends 124 may also each include a porous wall section 126 of the burner tube 118. The porous wall sections 126 may be of any appropriate configuration. Some embodiments may include a woven burner tube 118 at the porous wall sections 126. Other embodiments may include one or more ports 128 defined in the porous wall sections 126. Many embodiments include ports 128 defined only in the tube bends 124, but other particular embodiments may include ports located in some or all of the tube runs 120. The location of the ports 128 in these particular embodiments is not critical. The burner tube 118 may further include a burner tube intake end 130 and a burner tube termination end 132. The intake end 130 and termination end 132 may define a space S therebetween. In such embodiments, a partial tube run 134 may be connected to the burner tube intake end 130 and a respective tube bend 124. The gas line 102 may directly or indirectly connect to the burner tube intake end 130. A floating tube bend 136 may also be connected to the burner tube termination end 132 and a respective tube run 120. Other embodiments may include the burner tube 118 forming a closed loop. In a particular embodiment, the chamber walls 106 form a rectangular enclosure as the chamber 108, the rectangular enclosure including four chamber corners 110 formed by four chamber walls. In this embodiment, the burner tube 118 forms a generally rectangular gas burner 116 with four tube bends 124. Of course, other appropriate shapes for the chamber 108 and the gas burner 116 are contemplated, including triangular, pentagonal, hexagonal, heptagonal, octagonal, and the like.

As shown in FIGS. 4, 6-9, and 14, the cooking apparatus 100 may further include a plurality of flame director plates 138. Each flame director plate 138 may be disposed over a respective tube bend 124. Many embodiments may include each flame director plate 138 defining at least one flame director hole 140 therein. The flame director hole 140 may be of any appropriate size and shape. In some embodiments, the flame director hole 140 may be configured to allow some heat to converge toward the center of the chamber 108. Each flame director plate 138 may form an acute angle A with a burner plane P defined by the burner tube 118. The flame director plates 138 may be configured to check the upward flow rate of the heat emitted directly from the tube bends 124, divert a portion of the heat from the chamber corners 110 to the chamber walls 106, and generate radiant heat.

Turning now to FIGS. 4, 10, 13, and 14, a grease collector 142 may be disposed in the chamber 108 nearer the chamber bottom end 112 than the chamber top end 114. Some embodiments may include a blocking plate 144 disposed in the chamber 108 nearer the chamber bottom end 112 than the chamber top end 114. The blocking plate 144 may be included in addition to or instead of the grease collector 142. The grease collector 142 may also define the blocking plate 144. The grease collector 142 and/or the blocking plate 144 may block at least one closed wall section 122 of the burner tube 118. When the blocking plate 144 is described as blocking a portion of the burner tube this means that the blocking plate 144 overlies that portion of the burner tube so that if there are any perforations in that portion of the burner tube any flame from those perforations is blocked from flowing upward through the burner chamber. The closed wall section 122 of each tube run 120 may be partially blocked, completely blocked, or a majority of each tube run may be blocked by the grease collector 142 and/or the blocking plate 144. A particular embodiment including ports 128 in the tube runs 120 may include the blocking plate 144 or the grease collector 142 covering the ports in the tube runs. The grease collector 142 may include a plurality of chamfered corners 146. Each chamfered corner 146 may be positioned over a respective tube bend 124 and may be configured to define a corner flow passage 148 for the heat emitted from the tube bend. Stated another way, the grease collector 142 and the chamber walls 106 may define a plurality of corner openings 150 defining corner flow passages 148 for heat emitted from the burner tube 118. Each flame director plate 138 may be disposed over a respective corner opening 150. Furthermore, the flame director plates 138 may be connected to the grease collector 142 in some embodiments.

As shown in FIGS. 4, 6-9, and 14, the grease collector 142 may also further include a plurality of inner heat shields 152 attached thereto. Each inner heat shield 152 may be connected to the grease collector 142 adjacent a respective flame director plate 138. In some embodiments, each inner heat shield 152 may be integrally formed with a respective flame director plate 138. Each inner heat shield 152 may further be connected to a respective flame director plate 138 and may be disposed between the flame director plate and a center point C of the chamber 108. The inner heat shields 152 may be configured to prevent food placed nearer the chamber bottom end 112 than the chamber top end 114 from being overheated. In some embodiments, the inner heat shields 152 may include one or more shield holes 153. The shield holes 153 defined by the inner heat shields 152 may be of any appropriate size and shape. In one embodiment, the shield holes 153 may be configured to allow some heat to converge toward the center of the chamber 108.

Turning to FIGS. 4 and 11-14, the cooking apparatus 100 may also include a plurality of outer heat shields 154. Each outer heat shield 154 may be disposed between a respective tube bend 124 and a respective chamber corner 110. The outer heat shields 154 may extend parallel to two adjacent chamber walls 106 and may be configured to prevent the chamber corners 110 from overheating. This overheating prevention may aid in maintaining the structural integrity and outer coating of the cooking apparatus 100.

Shown in FIGS. 1-3 and 12-15, a chamber lid 156 may be removably disposed on the chamber walls 106 at the chamber top end 114. In many embodiments, the chamber lid 156 is hingedly connected to one of the chamber walls 106. The chamber lid 156 and the chamber walls 106 may define a ventilation gap G between each chamber wall and the chamber lid. The chamber lid 156 may include a plurality of spacers 158. Each spacer 158 may be configured to receive a respective chamber wall 106 and may maintain a respective ventilation gap G. Alternatively, instead of using spacers 158, the hinge of the lid 156 can be elevated and the side of the lid opposite the hinge can rest on an elevated support from one of the chamber walls 106 to maintain the ventilation gap G. The ventilation gap G may allow for better convection pathways in the chamber 108 due to the increased ventilation. In many embodiments, the lid 156 may enable steady flow of convective heat in a direction traveling away from the chamber bottom end 112 toward the chamber top end 114 and in a direction from the chamber top end back toward the chamber bottom end. The lid 156 may include any appropriate materials including, but not limited to, metals, ceramics, and the like. In some embodiments, the lid 156 may also cause radiant heat to project toward the chamber bottom end 112.

The current disclosure also relates to a method of operating a cooking apparatus 100. The method may include: supplying a burner tube 118 with a gaseous fuel (such as from natural gas tank 104); emitting the gaseous fuel from ports 128 defined substantially only on bends 124 of the burner tube; and burning the gaseous fuel in a cooking chamber 108 such that heat generated from combustion of the gaseous fuel is convected toward a top end 114 of the cooking chamber mostly along corners 110 of the cooking chamber, each corner defined as the meeting point of two adjacent sidewalls 106 and extending laterally outward along each sidewall for up to a third of each respective sidewall width W.

This written description uses examples to disclose the invention and also to enable any person skilled in the art to practice the invention, including making and using any devices or systems. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Although embodiments of the disclosure have been described using specific terms, such description is for illustrative purposes only. The words used are words of description rather than limitation. It is to be understood that changes and variations may be made by those of ordinary skill in the art without departing from the spirit or the scope of the present disclosure, which is set forth in the following claims. In addition, it should be understood that aspects of the various embodiments may be interchanged in whole or in part. While specific uses for the subject matter of the disclosure have been exemplified, other uses are contemplated. Therefore, the spirit and scope of the appended claims should not be limited to the description of the versions contained herein.

What is claimed is:
1. A cooking apparatus comprising:
   a plurality of chamber walls defining a chamber, the chamber including a plurality of chamber corners, a chamber bottom end, and a chamber top end; and a gas burner including a burner tube located nearer the chamber bottom end than the chamber top end, the burner tube including:
  a plurality of tube runs, each tube run including a run length extending substantially parallel with a respective chamber wall, each tube run including a continuous closed wall section along a majority of the run length such that the tube run has no holes anywhere in the tube run along the majority of the run length; and
  a plurality of tube bends, each tube bend disposed between two respective tube runs and including a porous wall section of the burner tube.

2. The cooking apparatus of claim 1, wherein:
the chamber forms a rectangular enclosure including four chamber corners formed by four chamber walls; and
the burner tube forms a generally rectangular gas burner with four tube bends.

3. The cooking apparatus of claim 2, wherein the burner tube further includes:
a burner tube intake end and a burner tube termination end, the intake end and the termination end defining a space therebetween;
a partial tube run connected to the burner tube intake end and a respective tube bend; and
a floating tube bend connected to the burner tube termination end and a respective tube run.

4. The cooking apparatus of claim 1, further comprising:
a plurality of flame director plates, each flame director plate disposed over a respective tube bend.

5. The cooking apparatus of claim 4, wherein each flame director plate defines at least one flame director hole therein.

6. The cooking apparatus of claim 4, wherein:
the gas burner tube defines a burner plane; and
each flame director plate forms an acute angle with the burner plane.

7. The cooking apparatus of claim 4, further comprising:
a grease collector disposed in the chamber nearer the chamber bottom end than the chamber top end, the grease collector blocking at least one closed wall section of the burner tube.

8. The cooking apparatus of claim 7, wherein the grease collector blocks the closed wall section of each tube run.

9. The cooking apparatus of claim 8, wherein each flame director plate is connected to the grease collector.

10. The cooking apparatus of claim 7, further comprising:
a plurality of inner heat shields, each inner heat shield connected to the grease collector adjacent a respective flame director plate.

11. The cooking apparatus of claim 10, wherein:
each flame director plate defines at least one flame director hole therein; each inner heat shield defines at least one shield hole therein; and
each flame director hole and each shield hole are configured to allow some heat to converge toward the center of the chamber.

12. The cooking apparatus of claim 10, wherein each inner heat shield is integrally formed with a respective flame director plate.

13. The cooking apparatus of claim 7, wherein the grease collector further includes:
a plurality of chamfered corners, each chamfered corner positioned over a respective tube bend and configured to define a corner flow passage for the heat emitted from the tube bend.

14. A cooking apparatus comprising:
a plurality of chamber walls defining a chamber, the chamber including a plurality of chamber corners, a chamber bottom end, and a chamber top end; and
a gas burner including a burner tube located nearer the chamber bottom end than the chamber top end, the burner tube including:
  a plurality of tube runs, each tube run including a run length extending substantially parallel with a respective chamber wall, a majority of the run length including a closed wall section of the burner tube; and
  a plurality of tube bends, each tube bend disposed between two respective tube runs and including a porous wall section of the burner tube; and
a plurality of outer heat shields, each outer heat shield disposed between a tube bend and a respective chamber corner.

15. The cooking apparatus of claim 1, further comprising:
a chamber lid removably disposed on the chamber walls at the chamber top end, the chamber lid and the chamber walls defining a ventilation gap between each chamber wall and the chamber lid.

16. The cooking apparatus of claim 15, wherein the chamber lid includes a plurality of spacers, each spacer configured to receive a respective chamber wall and to maintain a respective ventilation gap.

17. The cooking apparatus of claim 15, wherein:
the chamber lid and the ventilation gap are configured to allow steady flow of convective heat in a direction away from the chamber bottom end toward the chamber top end and in a direction from the chamber top end back toward the chamber bottom end; and
the chamber lid is configured to direct radiant heat toward the chamber bottom end.

18. A cooking apparatus comprising:
a plurality of chamber walls defining a chamber, the chamber including a plurality of chamber corners, a chamber bottom end, and a chamber top end;
a gas burner including a burner tube located nearer the chamber bottom end than the chamber top end, the burner tube including:
  a plurality of tube runs, each tube run including a run length extending substantially parallel with a respective chamber wall; and
  a plurality of tube bends, each tube bend disposed between two respective tube runs;
a blocking plate disposed in the chamber nearer the chamber bottom end than the chamber top end, the blocking plate covering a majority of the run length of each tube run, the blocking plate and the chamber walls defining a plurality of corner openings, each corner opening defining a corner flow passageway for heat emitted from the burner tube;
a grease collector disposed in the chamber nearer the chamber bottom end than the chamber top end, the grease collector defining the blocking plate; and
a plurality of flame director plates, each flame director plate disposed over a respective corner opening.

19. The cooking apparatus of claim 18, further comprising:
a plurality of inner heat shields, each inner heat shield connected to a respective flame director plate and disposed between the flame director plate and a center of the chamber.

20. The cooking apparatus of claim 19, further comprising:

a plurality of outer heat shields, each outer heat shield disposed between a respective tube bend and a respective chamber corner.

\* \* \* \* \*